March 6, 1962  KAZUYA FUJITA  3,023,872
ELECTROMAGNETIC COUPLING
Filed Nov. 3, 1959  2 Sheets-Sheet 1

INVENTOR:
KAZUYA FUJITA
BY
Richardson, David and Nordon
ATTYS.

March 6, 1962 KAZUYA FUJITA 3,023,872
ELECTROMAGNETIC COUPLING
Filed Nov. 3, 1959 2 Sheets-Sheet 2

INVENTOR:
KAZUYA FUJITA
BY
Richardson, David and Nardon
ATTY's.

3,023,872
ELECTROMAGNETIC COUPLING
Kazuya Fujita, 732, Tobacho, Tobashi, Mieken, Japan
Filed Nov. 3, 1959, Ser. No. 850,597
3 Claims. (Cl. 192—84)

This invention relates to improvements in or relating to an electromagnetic clutch or coupling, more particularly improvements of an electromagnetic coupling wherein friction facings are provided on both sides of a torque transmitting member for transmitting power from a driving member to a driven member.

The object of the present invention is to provide a clutch in which the friction facings on opposite sides of the torque transmitting member are brought into contact with friction surfaces for transmitting torque thereto, whereby the maximum torque which may be transmitted is very much greater than by an electromagnetic coupling of conventional structure, the dimensions are made remarkably smaller, almost all the component parts are made by simple punching operations. No spline is required. The complete clutch is formed by simply assembling the parts formed by punch press operations.

The electromagnetic coupling according to the present invention comprises in combination a flexible power transmitting member consisting of an annular leaf spring and provided with friction facings on both sides, two driving members which can come into contact simultaneously with both friction facings and an armature set opposite an electromagnet, one of the driving members being connected to the outer edge part of another annular leaf spring together with said armature and the inner edge part of this leaf spring being connected to the other driving member so that the two driving members may be pressed into contact with the friction facings by the deflection of said leaf springs.

Figure 1:
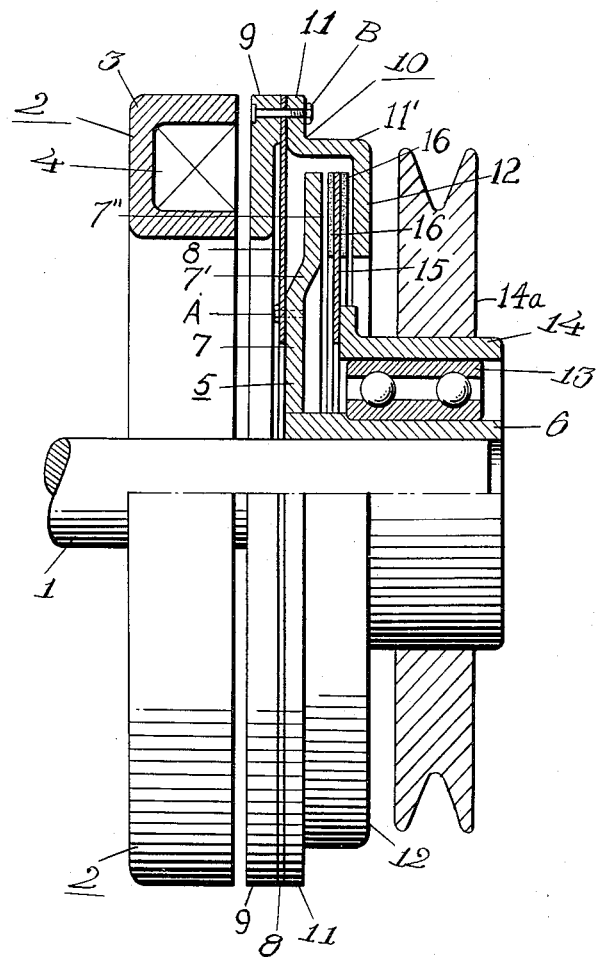
Figure 2:
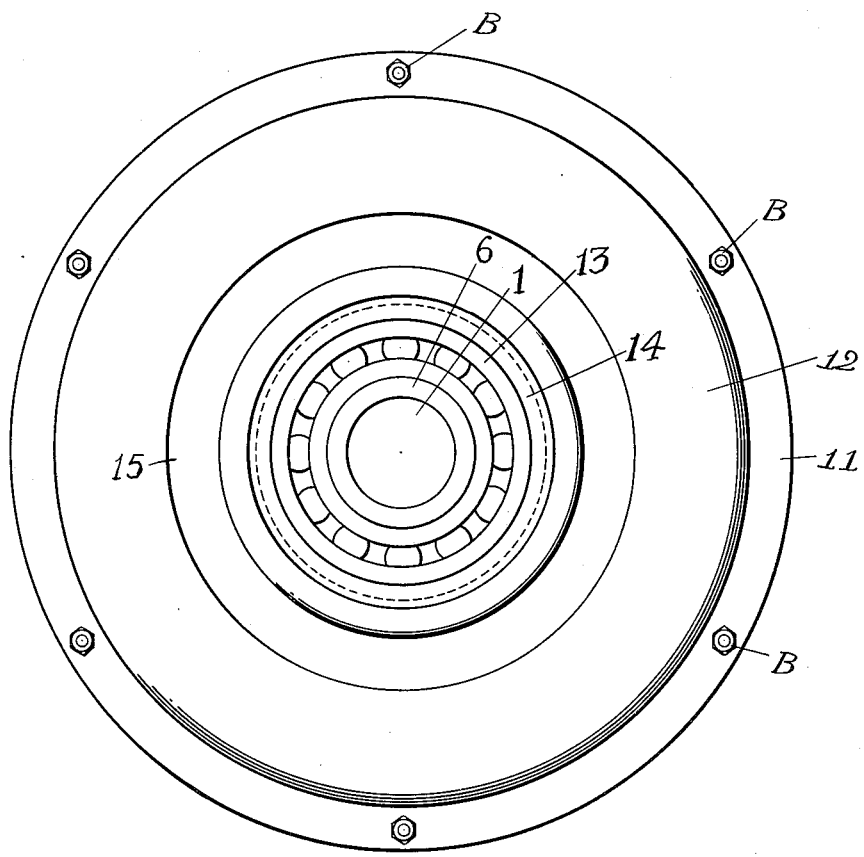

The present invention will be explained in the following with reference to the drawings in which:

FIGURE 1 is a side view of an electromagnetic coupling embodying the present invention with the upper half part axially sectioned and FIGURE 2 is an elevation of the same seen from the right in FIGURE 1 with the driven pulley removed.

In the drawings, 1 is a driven shaft and 2 is an annular electromagnet disposed concentrically with the driven shaft 1 and fixed to a proper place (which is generally a fixed part of the driven machine). 3 and 4 are a yoke and an exciting coil for said electromagnet 2, respectively. The yoke 3 is of a U-shaped cross-section and is annular. The annular exciting coil 4 is contained in the recess of the yoke 3. 5 is a driven rotor consisting of a hollow hub 6 and a shouldered or flange-shaped first driving member or disc 7 made integrally with hub 6 or fixed thereto by welding or other suitable means and is fitted and fixed to the driven shaft 1 by hub 6. As shown in FIGURE 1, the driving member 7 is bent rightward in its approximately middle part 7' so that the outer portion of this shouldered disc may form a friction surface 7" opposite a friction facing mentioned below. 8 is an annular leaf spring fixed at its inner edge part to the driving member 7 by a number of bolts A. To said leaf spring are fixed on the respective sides near the outer edge part an armature 9 opposite the electromagnet 2 and a second driving member 10 fixed to the spring member 8 and armature 9 by a number of bolts B. Said driving member 10 is shaped to provide a peripheral annular flange 11 and an annular driving part 12 extending inward from said flange which are interconnected by a cylindrical part 11' between them. As illustrated in FIGURE 1, the friction surface part 12 of driving member 10 is set to the right of and opposite the friction surface 7" with a proper clearance between them.

The cylindrical part 11' covers the outer periphery of a driven torque transmitting leaf spring 15 to be explained below. 13 is a ball-bearing fitted to the hub 6. A driven hub or sleeve 14 is borne by this bearing. A pulley 14a or other driven member is fixed to the hub 14 by welding or keying so that torque from a prime mover (not shown) connected to the shaft 1 may be transmitted to the hub 14. 15 is an annular torque transmitting leaf spring. Annular friction facings 16 are provided on the respective side surfaces near the outer free edge of said annular torque transmitting leaf spring so that the surfaces of said friction pieces may be positioned between the friction surface 7" of said first driving member 7 and the friction surface part 12 of said second driving member 10. The inner edge part of said torque transmitting leaf spring 15 is secured to the inner end of said driven hub 14 by welding or any other means.

The electromagnetic coupling of the present invention is formed as described above. Of course, the driving side and the driven side are interchangeable in the sense that torque may be transmitted to or from the shaft 1. The words "right" and "left" are used in the specification, for the sake of convenience in the explanation with reference to the drawings and have no specifically limitative meaning.

In the electromagnetic coupling according to the present invention, when the electromagnet 2 is not energized, no force of attraction acts on the armature 9, therefore the leaf spring 8 is not flexed, then the surfaces of both friction facings 16 have some clearances from the friction surfaces on the members 7 and 10 and the clutch will be disengaged.

Then, when the electromagnet 2 is energized, the armature 9 will be attracted by it and will move leftward in FIGURE 1 and the outer edge part of the annular leaf spring 8 will deflect also leftward and at the same time the second driving member 10 will move leftward together with the armature. Therefore, the friction surface 12 will first come into contact with the friction facing 16, then push it leftward so as to deflect the torque transmitting leaf spring 15 leftward and the friction facings 16 will be well pressed by the driving friction surfaces 7" and 12, respectively, of the driving members 7 and 10. In such state, the leftward axial movement of the armature 9 and the parts connected thereto will be limited and the clutch will be engaged, the armature 9 being maintained spaced from the stationary electromagnet 2 to permit free rotation of the clutch.

As described above, according to the present invention, the friction facings 16 are provided on both sides of the torque transmitting leaf spring 15 and the driving friction surfaces 7" and 12 of driving members 7 and 10 confront the respective friction facings 16 so that the torque applied to leaf spring 15 may be received from the driven side simultaneously from said two friction facings, therefore the maximum torque which may be transmitted will be twice as great as in the case of a single friction facing and the overall dimensions of the clutch can be made smaller. Further, in such structure, the first and second driving members are connected with each other through the annular leaf spring so that, when the armature is attracted, the deflection of said leaf spring may be utilized to move the second driving member and to hold and press the friction facings 16 of the torque transmitting leaf spring between the first and second driving members to produce the desired action. At noted above, most of the component parts of the clutch may be economically produced by simple punch press operations. Moreover, the arrangement of the parts permits the axial length of the clutch to be smaller than that of conventional clutches of the same maximum torque transmitting rating.

What I claim is:

1. An electromagnetic clutch of the class described, comprising a revoluble driving member; a revoluble driven member coaxial with said driving member; a stationary annular electromagnet, said electromagnet being concentric with the common rotational axis of said driving and driven members; an annular armature member located for attraction by said electromagnet; spring means securing said armature member to said driving member for rotation therewith, said spring means maintaining said armature member concentric with said driving and driven members while yieldingly permitting axial displacement thereof toward said electromagnet in response to energization of said winding; means defining a first flat annular friction surface concentric with the rotational axis of said driving member and fixed to said driving member for rotation therewith; means defining a second flat annular friction surface concentric with said driving member and fixed both to said armature member and to said spring means for rotation with said driving member and for axial displacement with said armature member, said first and second friction surfaces facing toward each other; further spring means connected to said driven member for rotation therewith; and two flat annular friction facings both carried by said further spring means for rotation with said driven member, each of said friction facings confronting one of said friction surfaces, said further spring means maintaining said friction facings concentric with the rotational axis of said driven member while yieldingly permitting axial displacement of said friction facings toward said first friction surface by engagement of one of said friction facings by said second friction surface in response to energization of said winding, axial displacement of said armature member toward said electromagnet being limited by engagement of said friction facings with said friction surfaces to maintain said armature member spaced from said electromagnet.

2. A clutch according to claim 1, wherein each of said spring means is a flat annular leaf spring.

3. A clutch according to claim 2, wherein said means defining said first friction surface is a shouldered disc the peripheral portion of which extends axially toward said friction facings, said first friction surface being formed on said peripheral portion, and in which the inner peripheral portion of the annular leaf spring constituting said first-named spring means is connected to said disc radially inwardly of said peripheral portion.

References Cited in the file of this patent

UNITED STATES PATENTS

| | | |
|---|---|---|
| 2,315,298 | Thompson | Mar. 30, 1943 |
| 2,407,757 | Mac Callum | Sept. 17, 1946 |
| 2,822,906 | Wisman | Feb. 11, 1958 |
| 2,919,777 | Walter | Jan. 5, 1960 |